(12) United States Patent
Pecher et al.

(10) Patent No.: US 7,860,689 B2
(45) Date of Patent: Dec. 28, 2010

(54) METHOD AND COMPUTER PROGRAMME FOR DETECTING THE STATIONARY STATE OF A ROLLER BEARING AND A ROLLER BEARING WHICH MAY BE ANALYZED THUS

(75) Inventors: Alfred Pecher, Stadtlauringen (DE); Sven Gempper, Volkach (DE)

(73) Assignee: Schaeffler KG, Herzogenaurach (DE)

( * ) Notice: Subject to any disclaimer, the term of this patent is extended or adjusted under 35 U.S.C. 154(b) by 879 days.

(21) Appl. No.: 11/572,857

(22) PCT Filed: Jul. 26, 2005

(86) PCT No.: PCT/DE2005/001312

§ 371 (c)(1),
(2), (4) Date: Feb. 8, 2007

(87) PCT Pub. No.: WO2006/012853

PCT Pub. Date: Feb. 9, 2006

(65) Prior Publication Data

US 2008/0317396 A1    Dec. 25, 2008

(30) Foreign Application Priority Data

Jul. 30, 2004    (DE) ...................... 10 2004 037 358

(51) Int. Cl.
H03F 1/26 (2006.01)
H04B 15/00 (2006.01)

(52) U.S. Cl. ..................................... 702/199

(58) Field of Classification Search .................. 702/199
See application file for complete search history.

(56) References Cited

U.S. PATENT DOCUMENTS 6,553,837 B1 * 4/2003 Lysen ........................ 73/579
7,389,701 B2 * 6/2008 Mol ....................... 73/862.322

* cited by examiner

*Primary Examiner*—Aditya Bhat
(74) *Attorney, Agent, or Firm*—Lucas & Mercanti, LLP (57) ABSTRACT

The invention relates to a method and a computer programme for detecting the stationary state of a roller bearing, comprising z rolling bodies, where z is a whole number, preferably an even number, to which a sensor arrangement is fixed, delivering a sinusoidal signal, dependent on the rotational position of the bearing on the rotation of the roller bearing. Said sinusoidal signal is sampled, whereupon sampled values are determined. According to the invention, a first average value ($MW_1$) of the sampled values of a first time interval ($J_1$) is determined (S120), whereupon the corresponding average value ($MW_2$, $MW_3$) of other time intervals ($J_2$, $J_3$) is determined (S132). The roller bearing is considered stationary as long as A) the corresponding average value ($MW_2$, $MW_3$) of the other time intervals ($J_2$, $J_3$) does not differ (S134) significantly from the first average value ($MW_1$) and/or B) the gradient between the first average value ($MW_1$) and the corresponding average value ($MW_2$, $MW_3$) of the other time intervals does not differ significantly from 0 (S335). The invention further relates to a roller bearing, provided with an analytical device for carrying out the inventive method or the computer programme.

26 Claims, 7 Drawing Sheets

METHOD AND COMPUTER PROGRAMME FOR DETECTING THE STATIONARY STATE OF A ROLLER BEARING AND A ROLLER BEARING WHICH MAY BE ANALYZED THUS

BACKGROUND OF THE INVENTION

The present invention relates to a method and to a computer program product (also called computer program or software for short) as claimed in claim 1 and 19, respectively, for detecting the stationary state of a roller bearing, and a roller bearing which may be analyzed with the aid of the aforementioned method, as claimed in claim 20.

Roller bearings are used in every machine in the industrial field. Due to the continuously increasing demands on the service life and the operational reliability of such machines, there is an increase in demand for being able to determine whether the roller bearing is rotating or is actually stationary. This information can be obtained with difficulty, in particular, when the roller bearing is possibly rotating very slowly because it is then possible, in the case of signals which are recorded and evaluated for detecting a stationary state, to distinguish only with difficulty between stationary state and slow rotation due to the noise in the evaluation electronics or in the sensor arrangements and due to the fact that the signal gradients are often only small in this boundary area.

BRIEF SUMMARY OF THE INVENTION

The present invention is based on the object of creating a method for detecting the stationary state of a roller bearing which detects with reliability but is as efficient as possible and which should also be implementable as a computer program. Furthermore, a roller bearing is to be created which can be or is connected to an evaluating device in which the detection of the stationary state is carried out reliably and as efficiently as possible.

This object is achieved by means of a method as claimed in claim 1 and by means of a computer program according to claim 19, respectively, and a roller bearing according to claim 20. Advantageous embodiments of the invention are the subject matter of the dependent claims.

The method according to the invention according to claim 1 provides for sampling the sinusoidal signal depending on the rotational position of the roller bearing during the rotation of the roller bearing in a number of intervals, calculating the average value of the samples in each interval and comparing the average value of the first interval with the average values of the subsequent intervals. The roller bearing is considered to be stationary for as long as the average values of the following intervals do not significantly differ from the average value of the first interval. As an alternative, the roller bearing can be considered to be stationary for as long as the gradient between the first average value and the respective average value of the further intervals does not significantly differ from 0. As a further alternative, a stationary state of the roller bearing can be assumed as long as either one of the two aforementioned conditions is met or cumulatively both of the aforementioned conditions are met.

According to the preferred method according to claims 2 to 8, the respective average values are determined particularly efficiently and with very little storage space requirement, the comparison of the following average values with the first average value or the comparison of the gradients with the number 0 being carried out as comparison with a preferably adjustable threshold value.

The speed of the detection of a stationary state of the roller bearing can be increased when, according to claim 11, the intervals adjoin one another, or according to claim 10, are interlocked with one another, wherein the method can be made simple if, according to claim 9, an equal number of sampling times are allocated to each interval.

The method according to the invention operates particularly effectively if each of the time intervals maximally covers a rotational angle of the roller bearing which corresponds to less than one quarter of the complete distance covered by a rolling body rolling over a sensor—that is to say an angle of rotation of 90°/z in the case of z rolling bodies.

If at least two sensor arrangements are provided in a roller bearing, the distance from one another of which is unequal to an integral multiple of the distance between two adjacent rolling bodies, the method according to the invention according to claim 18 can also be used for detecting a possibly occurring to and fro movement of the roller bearing—usually called "bucking"—by an angle of rotation of less than 360°/z when the signals of all sensor arrangements are evaluated. If more than z sensor arrangements are provided, this can be used for making the distance between the sensor arrangements from one another—in the circumferential direction of the roller bearing—smaller than the distance between two adjacent rolling bodies from one another—also in the circumferential direction of the roller bearing, as a result of which, when the signals of all sensor arrangements are evaluated in parallel, any bucking which may occur can be detected particularly reliably.

The roller bearing according to the invention according to claim 20 comprises an evaluating device by means of which the methods according to claims 1 to 18 or, as an alternative, the computer program according to claim 19, which can be stored on a storage medium (e.g. RAM, ROM, CD, DVD, floppy disk, hard disk, flash memory etc.) and/or can be called up via a network, can be carried out. This takes into consideration that the evaluating device preferably constructed as ASIC in a chip only has limited computing capacities in its size due to the placement in the groove of the outer ring. The width of the chip is determined a priori by the width of the outer ring of the bearing. In addition, the chip is not too long in the circumferential direction of the outer ring and since otherwise the chip located in the groove would be bent disproportionately due to the curvature of the outer ring and thus a defect would threaten.

BRIEF DESCRIPTION OF THE SEVERAL VIEWS OF THE DRAWINGS

Further advantages, features and peculiarities of the invention are obtained from the subsequent description of preferred but not restricting embodiments of the invention by means of the schematic drawings, which are not true to scale, in which:

FIG. 1 shows a schematic representation of a roller bearing according to the invention, FIG. 2 schematically shows various possibilities of the arrangement of strain gauges in a Wheatstone bridge circuit in the outer groove of a roller bearing according to the invention, FIG. 3a to FIG. 3c in each case show an interference-free section of a signal to be evaluated, with various possibilities of the arrangement of the sampling intervals, FIG. 3a showing adjoining sampling intervals, FIG. 3b showing spaced-apart sampling intervals and FIG. 3c showing interlocked sampling intervals.

DETAILED DESCRIPTION OF THE INVENTION

Initially, a roller bearing according to the invention will be described by means of a preferred embodiment and then advantageous embodiments of the method according to the invention for detecting the stationary state will be described in detail by using flow charts.

Figure 1:
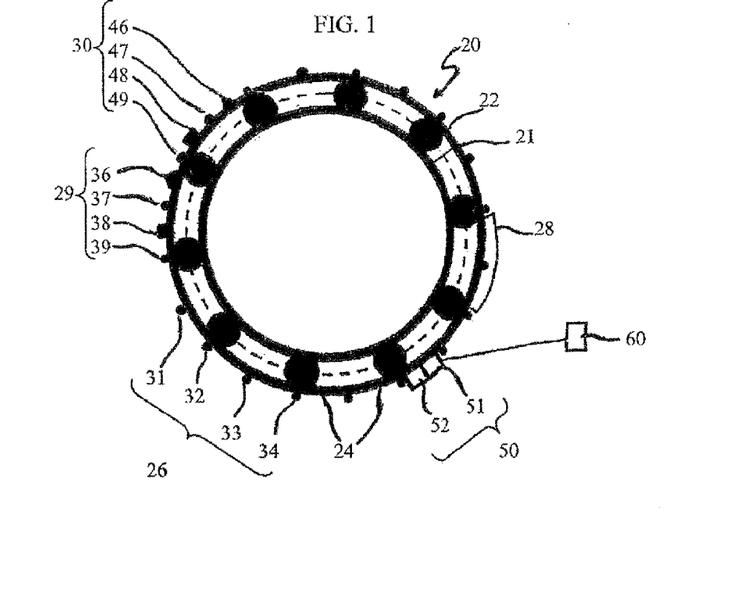
Figure 2:
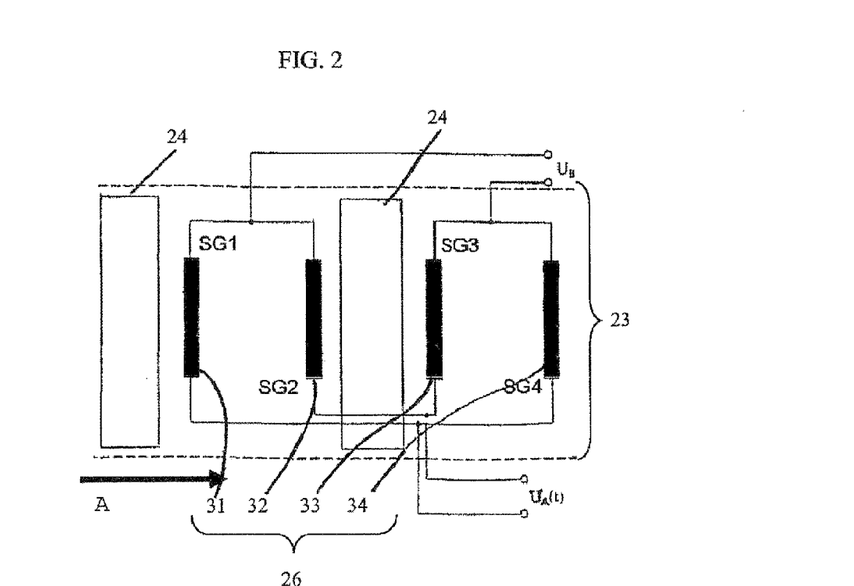

FIGS. 1 and 2 represent the main components of the roller bearing 20 according to the invention, a so-called intelligent bearing. The representation is symbolic and is used for illustration but is not to be considered as restrictive.

The intelligent bearing is intended to provide the user with information whether the roller bearing (hereinafter also abbreviated as "bearing") 20 is rotating or not. Such a bearing 20 comprises an inner ring 21 and an outer ring 22, at the outside of which a circumferential longitudinal groove 23 is provided. Between the inner ring 21 and in the outer ring 22, rolling bodies 24 are arranged so that the inner ring 21 is rotatable with respect to the outer ring 22. To pick up the data, sensor arrangements 26—also called "sensors" 26 in brief—are used which, in the preferred exemplary embodiment, are in each case four strain gauges 31 to 34, combined to form a Wheatstone bridge circuit, which are accommodated in an external longitudinal groove 23 in the outer ring 22 and the resistance of which changes by the rolling bodies 24 rolling over. Furthermore, a circuit board 28 arranged in the groove 23 is shown schematically which establishes the conductor connections between the individual strain gauges 31 to 34 of each sensor 26 and the conductor connections between the sensors 26 and the evaluating devices 50 described later. The direction of movement of the rolling bodies 24 is designated by an arrow A in FIG. 2.

The groove 23, and thus the circuit board 28, is located in the entire circumference of the outer ring 22 with sensors 26 arranged at equidistant intervals (strain gauges 31 to 34) and a corresponding evaluating device 50, comprising, for example, two evaluating units 50 and 51, for each sensor as will be explained in greater detail later. The resultant sensor signal 40 is intended to be evaluated in a suitable manner by the evaluating device 50, preferably electrical circuits in the form of application specific integrated circuits, so-called ASICs. In this arrangement, the method according to the invention running in the ASICs for detecting a stationary state must be dimensioned in such a manner that a consistent on-line evaluation of the data is possible in spite of the restricted construction space and thus the restricted chip size. The complete unit of sensor and intelligent evaluating hardware thus represents a so-called "smart sensor" which makes it possible to supply a possible stationary state of the bearing 20 to the potential customer in real time.

For the embodiment of the method according to the invention, the geometric arrangement of the sensors 26 in the outer ring 22 must be taken into consideration since this determines the variation of the signal 40 delivered by the sensor 26 and thus the procedure for dealing with the sensor signal 40 using signal theory is also predetermined. The four strain gauges (hereinafter also abbreviated by SG) 31 to 34 of a sensor 26, interconnected to form a Wheatstone bridge, are arranged in the longitudinal direction of the groove 23 in such a manner that their distance from one another corresponds to half the rolling body distance (compare FIG. 2). This ensures that rolling bodies 24 always roll over two strain gauges 31 and 33 or 32 and 34, respectively, of a bridge at the same time. The first strain gauge 31 of the following Wheatstone bridge in the groove 23 is again located at half the rolling body distance from the last strain gauge 34 of the preceding bridge. This arrangement results in z/2 sensors 26 for z rolling bodies in the bearing. As an alternative, fewer or even more than z sensors can be present, for example z/2−1, z2+1, z, z+1 or 2 z sensors.

An example with z sensors, of which only two sensors 29 and 30 are shown, is also shown in FIG. 1. In this arrangement, four SG (designated by different symbols) in each case form one sensor, that is to say 36, 37, 38 and 39 form the sensor 29 and 46, 47, 48 and 49 form the sensor 30. The distances of the individual SGs within a sensor are considerably reduced and, therefore, the distance from one sensor to the next can also be greatly reduced in appropriate manner. This makes it possible to detect any "bucking" of the bearing 20, that is to say a to and fro movement by relatively small angles of rotation which otherwise would possibly not be achievable with greater sensor distances. The sensors 29 and 30 shown are then followed by other sensors, not shown.

A further possible arrangement of the sensors is obtained by the fact that the eight SGs of two sensors which are located behind one another (considering sensors 29 and 30 here for the illustration), in deviation from the representation in FIG. 1, are interconnected in such a form, i.e. the sensors are interlocked with one another in the manner of a comb, that the SGs are allocated to the sensors in the longitudinal direction of the groove 23 in the following manner: a first sensor comprises SGs 39, 37, 49 and 47 and a second sensor comprises SGs 38, 36, 48 and 46. Other such sensors can be provided but are not shown. As a result, two phase-shifted edges (signals 40) are generated in a very small space by rolling over which are especially well suited for the evaluation of to and fro movements.

It is also possible to interconnect only two SGs (for example the first and the second SG), instead of with a third and fourth SG, respectively, with in each case one resistor which is not strain-sensitive to form in each case one Wheatstone half bridge. Instead of the SGs mentioned, other sensors, such as piezoelectric or magnetic sensors, can also be used. This may result in a different ratio of sensors to rolling bodies.

FIG. 2 schematically and by way of example shows for a sensor the geometric distribution of strain gauges and rolling bodies 24 in the groove 23 of the outer ring 22. When rolling over SG1 31 and SG3 33, the bridge output voltage $U_A(t)$ rises with increasing deformation of the strain gauges caused by the roller bearing pressure, the supply voltage $U_B$ remaining constant. The cross-connected strain gauges in the bridge circuit are synchronously roiled over or deformed as a result of which the rise in output voltage is further increased. As the process continues, the strain gauges SG1 31 and SG3 33 are increasingly relieved until they have reached again their original resistance value and the bridge is almost balanced. When subsequently strain gauges SG2 32 and SG4 34 are rolled over, the same variation in the output voltage occurs, only with reversed sign due to the polarity of the bridge circuit so that finally a wave-shaped approximately sinusoidal variation is produced.

Figures 3A, 3B:
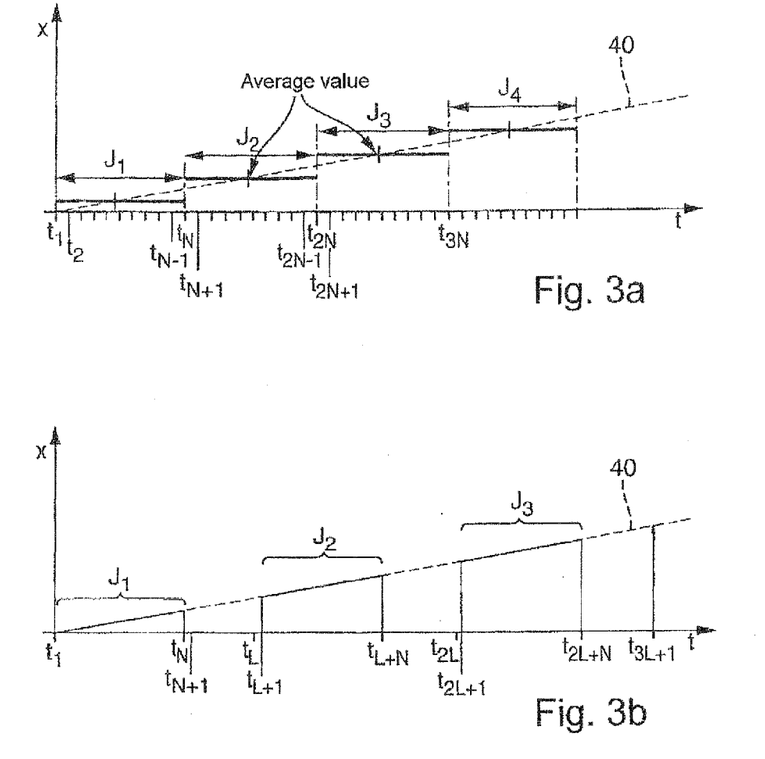
Figure 3C:
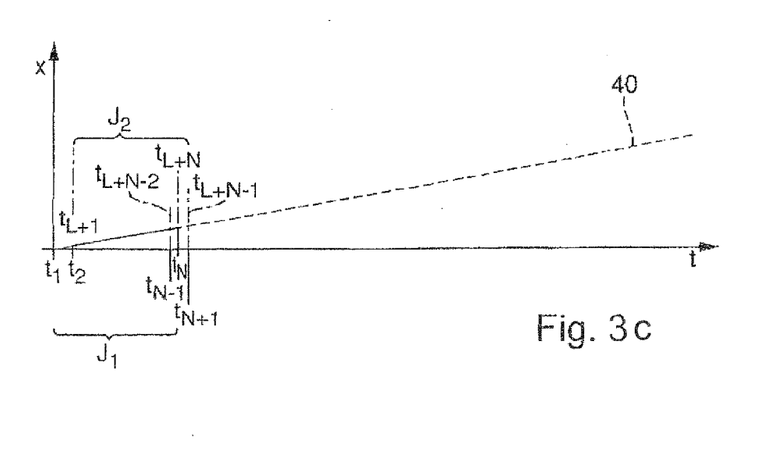

In FIGS. 3a to 3c, a small section of a typical variation of the signal 40 after the zero transition is shown for representing the different possibilities which is why the signal 40 appears to be linear even though it is actually sinusoidal. For the representation, it is assumed that the first sampling interval $J_1$ in each case begins exactly at zero transition even though this is not the case, as a rule, since the position of this first sampling interval $J_1$ depends on the starting time of the method.

According to the first possibility, shown in FIG. 3a, the intervals $J_k$ adjoin one another. That is to say, interval $J_1$ with N sampling times $t_1$ to $t_N$ adjoins the interval $J_2$ with N sampling times $t_{N+1}$ to $t_{2N}$, and this, in turn, adjoins the interval $J_3$ with N sampling times $t_{2N+1}$ to $t_{3N}$ etc. Thus, all sampling times are used for detecting the stationary state.

According to the second possibility, shown in FIG. 3b, in contrast, the sampling intervals are at a distance from one another. In the first time interval comprising L sampling times, sampling occurs at the N sampling times of the first sampling interval $J_1$ from $t_1$ to $t_N$, and after that the process waits until sampling time $t_L$ until the remaining L-N sampling times have elapsed before the second interval $J_2$ is reached. It is only then that sampling occurs in this second interval $J_2$ from sampling time $t_{L+1}$ again at N successive sampling times up to $t_{L+N}$ and then the process waits until sampling time $t_{2L}$. This procedure continues in the following intervals. FIG. 3b shows that L is greater than N in this example. Such an arrangement of the intervals can be advantageous, for example, with an extremely slow rotation of the roller bearing 20.

According to the third possibility shown in FIG. 3c, the sampling intervals are interlocked with one another. In the example shown in FIG. 3c, this is shown for the case of Lot. This means nothing other than that the second interval 32 already begins with its first sampling time $t_{L+1}$ at the second sampling time $t_2$ of the first interval $J_1$, that is to say, this sampling time $t_{L+1}$ is identical with the sampling time $t_2$. The second interval $J_2$ ends with the sampling time $t_{L+N}$ which corresponds to the first sampling time $t_{N+1}$ after the first interval $J_1$. Due to this extreme overlap of the intervals, it may be possible to achieve a very rapid detection of a stationary state.

The said values of N and L can be selected arbitrarily, i.e. adapted to the respective peculiarities of the bearing 20 to be detected and, as a rule, are determined empirically, wherein the interval width can vary from system to system.

In the following, advantageous embodiments of the method according to the invention are described by means of flow charts.

Figure 4:
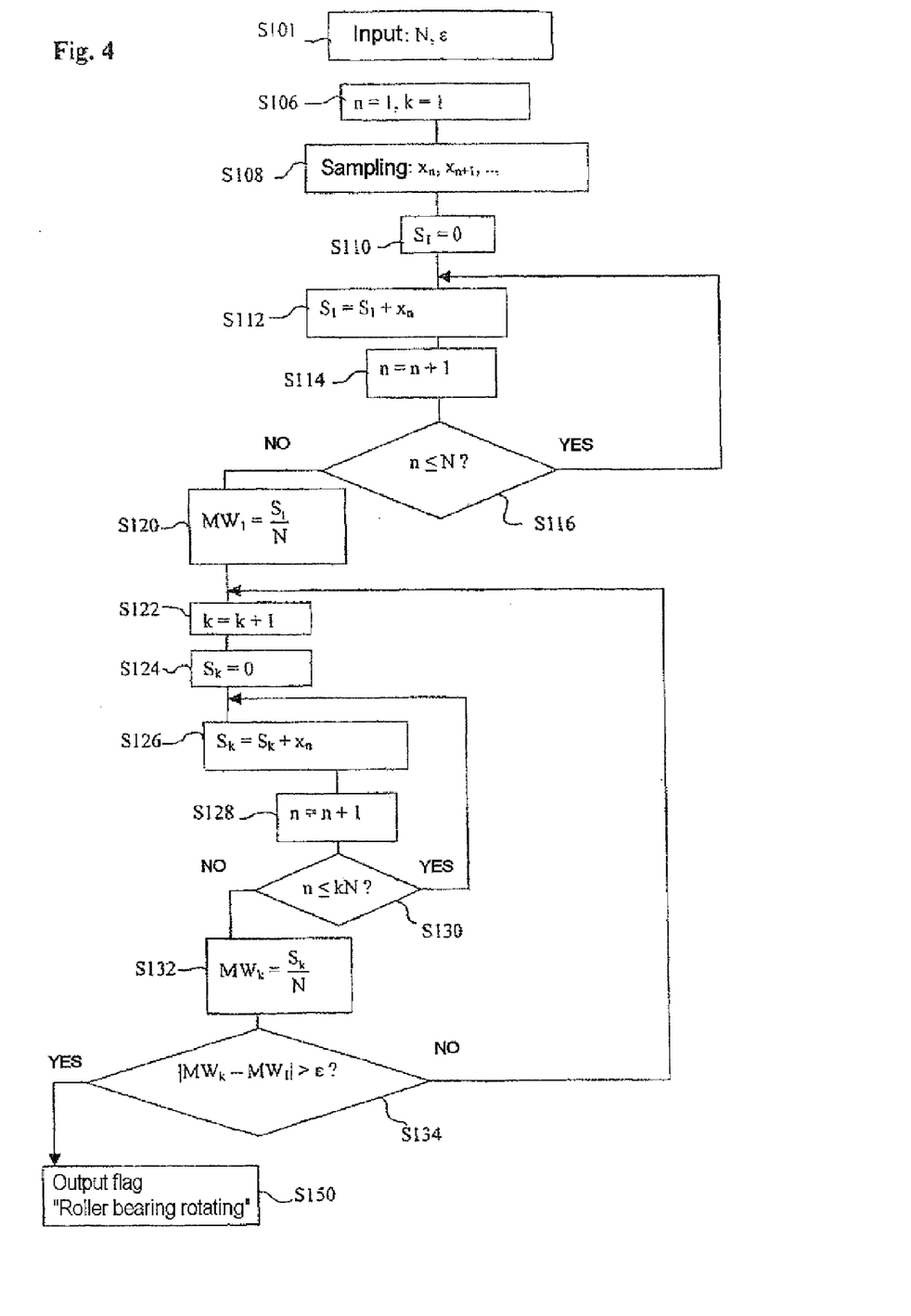
FIG. 4 shows a flow chart of a first embodiment of the method according to the invention.

In FIG. 4, a simple method is shown as first embodiment, in which the sampling intervals adjoin one another. In step S101, the parameters N are input as a number of the sampling times per interval and a threshold value $\epsilon$. After that, the starting values for the run variables n and k are in each case set to 1 in step S106. After that, the method is capable of processing the samples $x_n$, $x_{n+1}$ etc. from step S108 onward. In step S110, the starting value $S_1$ for the first sum, from which the first average value $MW_1$ of the samples in the first sampling interval $J_1$ is later calculated, is set to 0. In step S112, the current sample $x_n$ is added to this starting value $S_1$. Following this, the run variable n is incremented by 1 in step S114 and in step S116 a check is made whether the end of the first sampling interval has not yet been reached, in other words, whether n≦N. If the end of the first sampling interval has already been reached or exceeded ('NO' branch), the first average value $MW_1$ is calculated in step S120 by dividing the sum $S_1$ of the samples by the number N of samples. Otherwise ("YES" branch), the method goes back to step S112 and is continued until the end of the first sampling interval $J_1$ is reached and the first average value $MW_1$ can be calculated. After that, the run variable k is incremented by 1 in step S122 and the kth sum $S_k$ is set to 0 in step S124.

After that, the current sample is added to the current sum $S_k$ in step S126—similar to step S112. After that, the run variable n is incremented by 1 in step S128 and in step S130—analogously to step S116—a check is made whether the end of the kth sampling interval has not yet been reached, in other words whether n≦kN. If the end of the kth sampling interval has already been reached ("NO" branch), the kth average value $MW_k$ is calculated in step S132 by dividing the sum $S_k$ of the samples of the kth interval $J_k$ by the number N of samples of this interval $J_k$. Otherwise ("YES" branch), the method goes back to step S126 and is continued until the end of the kth sampling interval is reached and the kth average value $MW_k$ can be calculated.

Finally, the first average value $MW_1$ is subtracted from the kth average value $MW_k$ in step S134 and a check is made whether the amount of this difference is greater than the threshold value c initially input. If this is so, which corresponds to the "YES" branch, an output flag, that the roller bearing 20 is rotating, is set in step S150. If necessary, this information can then be output and/or displayed on a display 60. If the threshold vale $\epsilon$ has not been exceeded, the method goes back to step S122 and is continued at least until the end of the next sampling interval $J_{k+1}$ is reached and the (k+1)th average value $MW_{k+1}$ can be calculated. To ensure continuous monitoring of the roller bearing 20 for a possible stationary state, it can be provided that, after step S150, the method goes back to step S122 and is continued.

Figure 5:
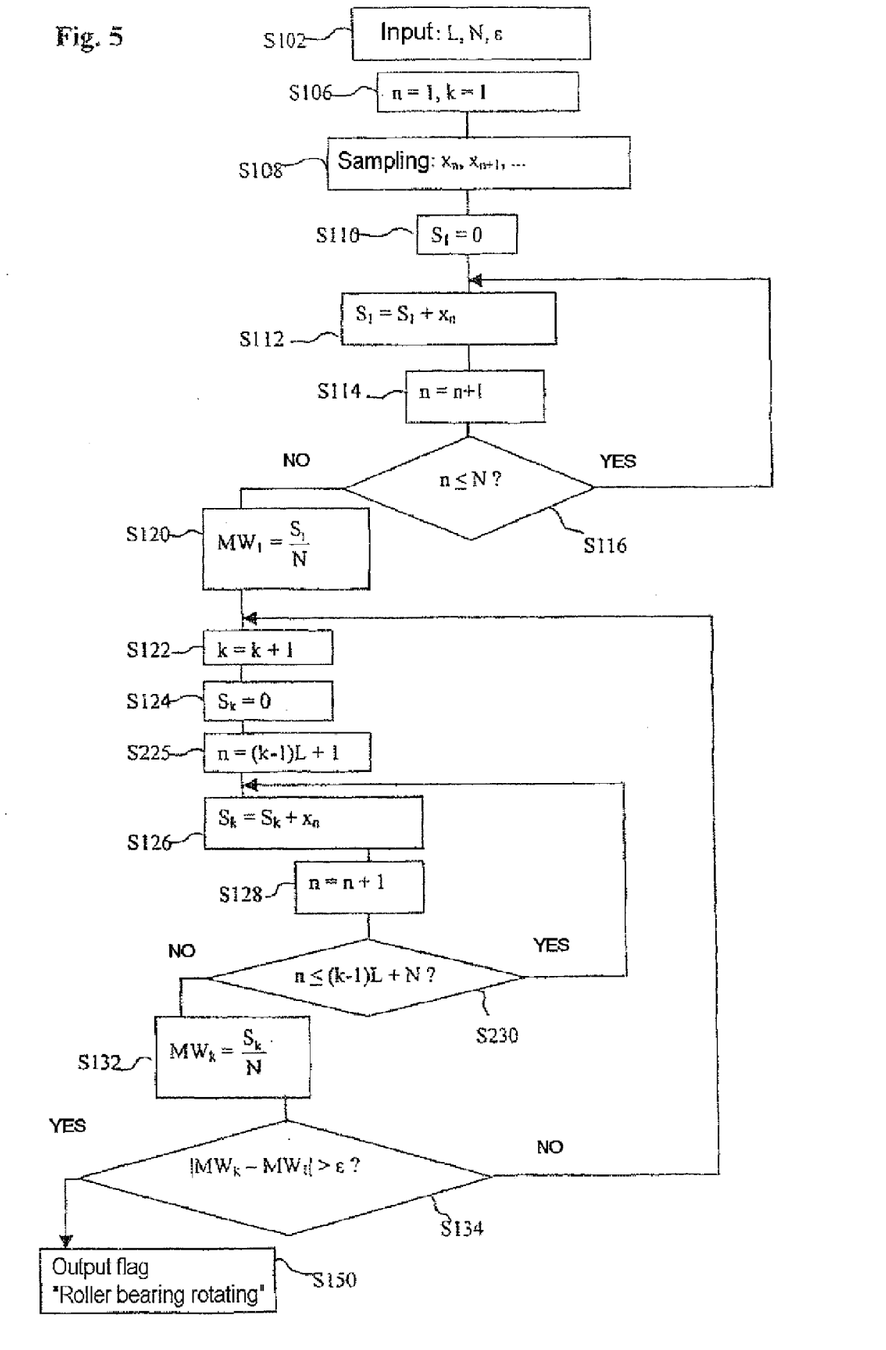
FIG. 5 shows a flow chart of a second embodiment of the method according to the invention.

A further advantageous, second embodiment of the method according to the invention is shown in FIG. 5. In this case, in step S102, it is required, in addition to inputting the step S101, to input the parameter L which fixes the position of the intervals relative to one another. The further method initially proceeds according to FIG. 4 as up to and including step S124. In step S225, n is then set to the value of (k−1)L+1 in order to jump over the L-N samples since passing through step S116. After that, the known summation is again performed in step S126 and in step S128, the run variable n is incremented by 1 after which a check is made in step S230 whether the end of the kth sampling interval has not yet been reached, in other words whether n≦(k−1)L+N here. If the end of the kth sampling interval has already been reached, the kth average value $MW_k$ is again calculated in step S132 by dividing the sum $S_k$ of the samples of the kth interval $J_k$ by the number N of the samples of this interval $J_k$. Otherwise, the method goes back to step S126 and is continued at least until the end of the kth sampling interval is reached and the kth average value $MW_k$ can be calculated. The further course of the method from step S134 onward takes place as in the first embodiment.

Figure 6:
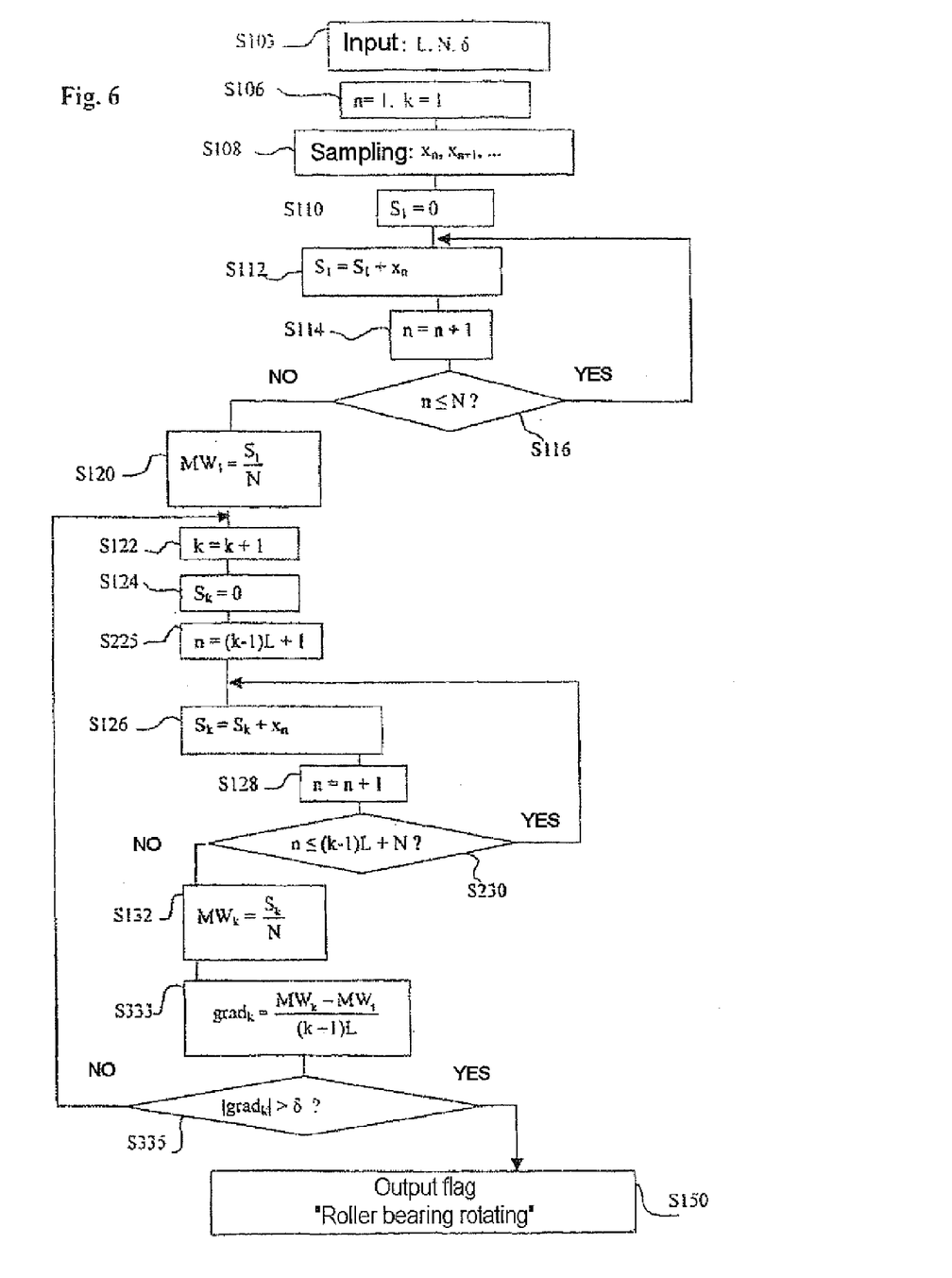
FIG. 6 shows a flow chart of a third embodiment of the method according to the invention.

A further third embodiment of the method according to the invention will now be described with reference to FIG. 6. Instead of the aforementioned threshold value $\epsilon$, a threshold value δ is now input in addition to the parameters L and N in step S103. After that, the method proceeds as in FIG. 5 up to the calculation of the kth average value $MW_k$ in step S132. After step S132, the gradient $grad_k$ between the average value $MW_k$ and $MW_1$ is calculated in step S333 by subtracting the first average values $MW_1$ from the kth average value $MW_k$ and dividing the difference by the distance (k−1)L of the two average values Subsequently, a check is made in step S335 whether the value of the gradient $grad_k$ is greater than the threshold value δ initially input. If this is so, it is assumed that the roller bearing 20 is rotating and in step S150 a corresponding output flag is set. Otherwise, the method goes back to step S126 in order to determine the gradient $grad_{k+1}$ in the (k+1)th interval, and to compare its value with the threshold value δ in step S335. To ensure here, too, that the roller bearing 20 is continuously monitored for a possible stationary state, it can also be provided that, after step S150, the method goes back to step S122 and is continued.

Figure 7:
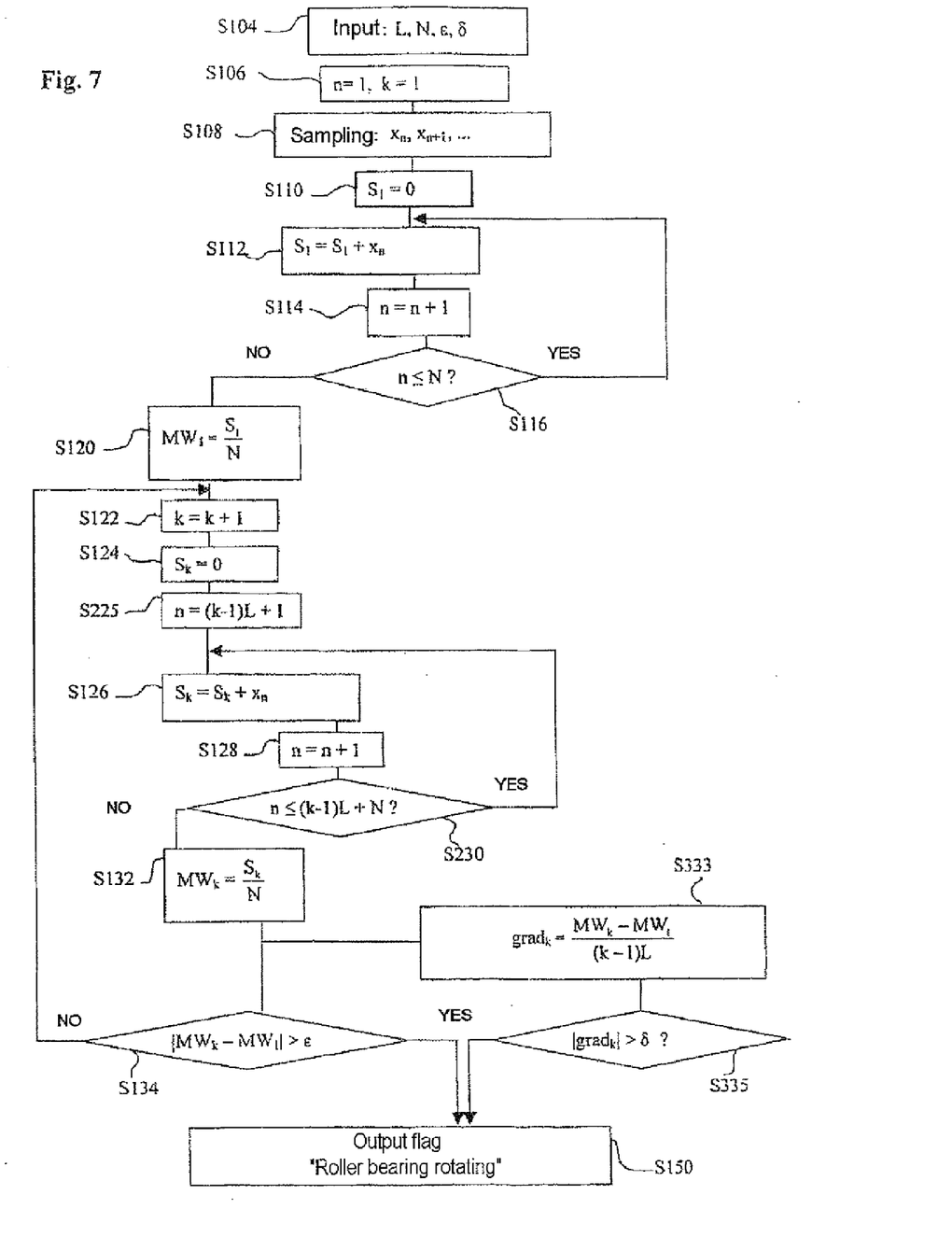
FIG. 7 shows a flow chart of a fourth embodiment of the method according to the invention.

FIG. 7 shows a fourth embodiment of the method according to the invention. In step S104, a threshold value E and a threshold value δ are input apart from the parameters L and N. After that, the method proceeds as in FIGS. 5 and 6 up to the calculation of the kth average value $MW_k$ in step S132. After step S132, two branches are carried out in parallel. On the one hand, the value of the difference of the average values $MW_1$ and $MW_k$ is compared with the threshold value ϵ in step S134 as in FIGS. 4 and 5 and from the result, a rotation of the roller bearing 20 is assumed, if applicable and, on the other hand, the value of the gradient $grad_k$ determined in step S333 is compared with the threshold value δ in step S335 and from the result a rotation of the roller bearing 20 is assumed, if applicable. In other words, this means that in step S150, an output flag for the rotation of the roller bearing 20 is set when one of the two conditions of steps S134 and S335 is met which corresponds to the OR operation on these. The method can thus take into consideration two different criteria for detecting a rotation of the roller bearing 20. If none of the two conditions of steps S134 and S135 is met, the method is continued in every case from step S122 onward. Here, too, the method can also be continued, if desired, when a rotation of the roller bearing 20 is found in step S150.

Figure 8:
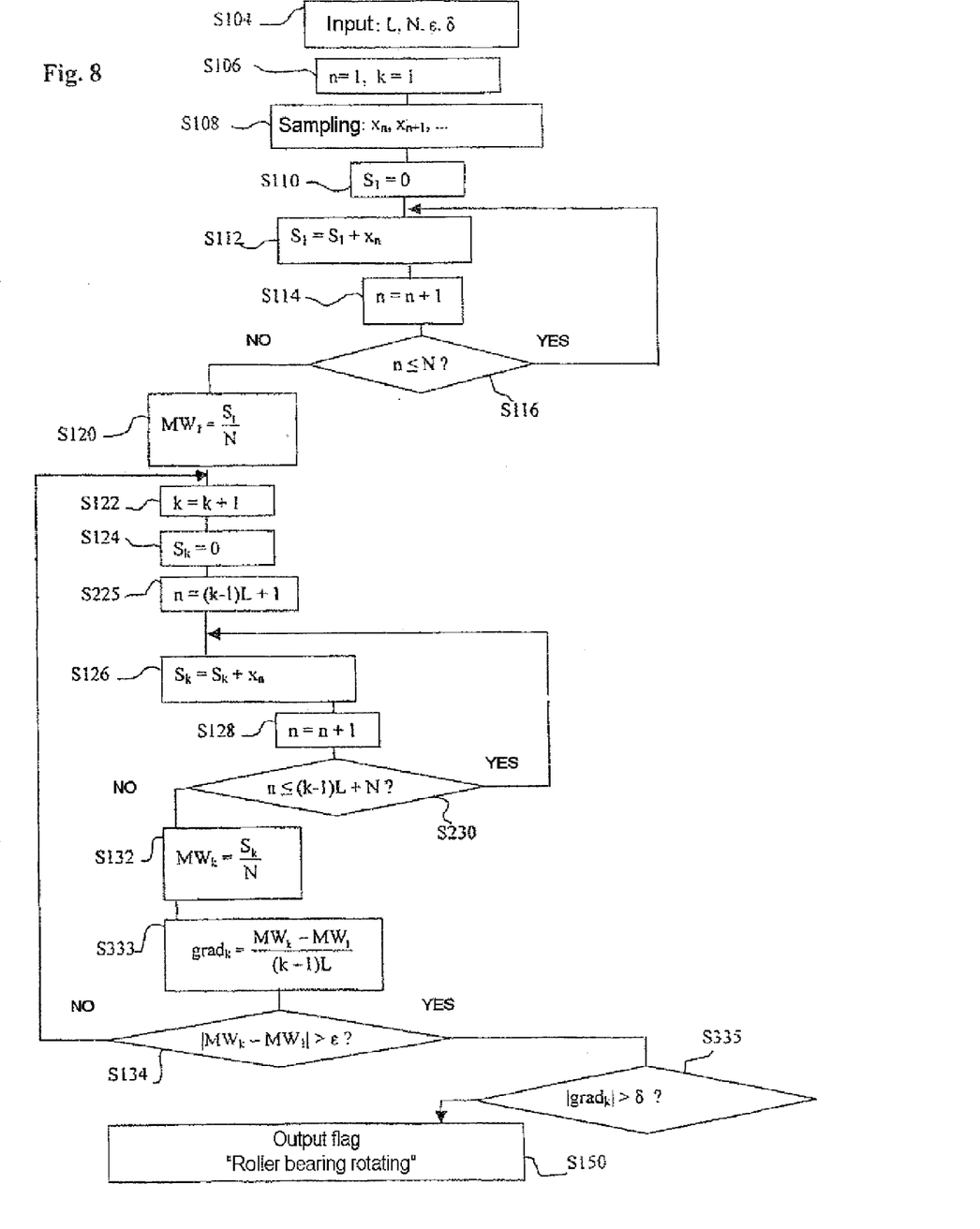
FIG. 8 shows a flow chart of a fifth embodiment of the method according to the invention.

In FIG. 8, which shows a fifth embodiment of the method according to the invention, a cumulative consideration of the two conditions of steps S134 and S335—corresponding to an AND operation—as prerequisite for the roller bearing 20 to be considered as rotating, is shown. From step S104 to step S132, the method proceeds as in the fourth embodiment.

After step S132, the gradient $grad_k$ is calculated in step S333 as in the fourth embodiment after which the amount of the difference of the average values is compared with the threshold value ϵ in step S134, whereupon the value of the gradient $grad_k$ is compared with the threshold value δ in step S335. It is only when both comparisons of steps S134 and S335 have led to the "YES" result that the output flag for the rotation of the roller bearing 20 can be set in step S150. Naturally, as an alternative, step S333 can also be carried out only after step S134 or the order of the steps S335 and S134 can be mutually exchanged.

The aforementioned threshold values E and 6 are usually force-dependent, that is to say, they depend on the force with which the rolling bodies 24 act on the sensor arrangements 26 and 29, respectively. These threshold values ϵ and δ can be selected either according to theoretical information or can be empirically determined.

In an exemplary application, a signal having a typical frequency of 1 Hz is sampled with a frequency of 80 kHz. Accordingly, the times $t_m$ of the sampling are apart by 12.5 μs. A preferred width of the time intervals $J_k$ with the samples $x_m(x_1, \ldots, x_{2000})$ is obtained for the case of precisely adjoining intervals as N=2000 values.

Although this has not been explicitly mentioned in the aforementioned five embodiments of the method according to the invention, sums or intermediate sums $S_k$ which are not (no longer) needed after the calculation of the associated average value $MW_k$, and average values $MW_k$ (except the first average value $MW_1$) and/or gradients $grad_k$ which are not (no longer) needed after comparison with the corresponding threshold values ϵ and δ, respectively, may be deleted without storage, if necessary.

In the preceding text, it was assumed that an identical number of samples N is allocated to each sampling interval. In individual cases, however, it may be appropriate to vary the number of sampling points per sampling interval in the course of the process by intervention from outside or to allow it to be changed or adapted by the method itself. Furthermore, the calculation of the respective average values and gradients is not restricted to the advantageous method described but can also take place in another suitable manner.

It must be noted that the features of the invention described with reference to individual embodiments such as, for example, individual steps from the flow charts or constructional peculiarities can also be present in other embodiments unless otherwise specified or inherently barred for technical reasons.

The invention claimed is:

1. A method for detecting the a stationary state of a roller bearing having z rolling bodies, where z is an integral number, to which a sensor arrangement is fixed, comprising:

attaching a sensor arrangement to a roller bearing, obtaining a sinusoidal signal from the sensor arrangement, delivering the sinusoidal signal to an evaluating device, dependent on a rotational position of the roller bearing upon rotation of the roller bearing, where the signal is sampled, and samples are determined, determining a first average value of the samples of a first time interval, and determining a respective average value of further time intervals wherein the roller bearing is stationary, as long as:

A) the respective average value of the further time intervals is substantially equal to the first average value or B) a gradient between the first average value and the respective average value of the further time intervals is substantially equal to 0.

2. The method as claimed in claim 1, comprising the following steps:

a) sampling of a signal delivered from the sensor arrangement at times for determining samples, b) calculating as a first average value a kth average value of a predetermined number N of samples at times which are located in a kth time interval of p time intervals, of which each one has a predetermined duration, c) storing the first average value, d) calculating a (k+1)th average value of a predetermined number of samples at times which are located in a (k+1)th time interval of the p time intervals e) assessing whether the (k+1)th average value differs from the first average value stored in step c) by at least a predetermined, preferably adjustable threshold value, f) if the assessment in step e) is positive: establishing that the roller bearing is rotating, otherwise g) incrementing k by 1 and repeating steps d) to f), wherein k, m, n, p, L, M and N are integral numbers and the following applies: $1 \leq k < p$, $0 < n \leq N < M$, $0 < m \leq M$.

3. The method as claimed in claim 2, wherein each (k+1)th average value, in the case of which it is found in step e) that it does not differ by at least the predetermined threshold value from the first average value stored in step c), is discarded without being stored.

4. The method as claimed in claim 2, wherein the average values of each time interval are calculated in steps b) and d) in that the first sample and the second sample are added and their sum is stored as intermediate sum, whereafter each further sample is added to the intermediate sum and this is stored until the last sample of the relevant time interval is reached, and subsequently the last intermediate sum is divided by the respective number of samples taken into consideration.

5. The method as claimed in claim 2, wherein the same number N of times is allocated to each time interval in steps b) and d).

6. The method as claimed in claim 2, wherein that L<N applies.

7. The method as claimed in claim 2, wherein L=N applies.

8. The method as claimed in claim 2, wherein the distance of a time to the preceding time $t_{m-1}$ and subsequent time $t_{m+1}$ is equidistant.

9. The method as claimed in claim 1, comprising the following steps:
   a) sampling of the signal at times for determining samples,
   b) calculating as a first average value a kth average value of a predetermined number N of samples at times which are located in a kth time interval of p time intervals of which each one has a predetermined duration,
   c) storing the first average value,
   d) calculating a (k+1)th average value of a predetermined number of samples at times which are located in a (k+1)th time interval of the p time intervals,
   h) determining the gradient between the (k+1)th average value and the first average value,
   i) assessing whether the gradient determined in step h) differs from 0 by at least one predetermined, adjustable threshold value and storing the gradient
   j) if the assessment in step i) is positive: establishing that the roller bearing is rotating, otherwise
   k) incrementing k by 1 and repeating steps d) and h) to j), wherein k, m, n, p, L, M and N are integral numbers and the following applies: $1 \leq k < p$, $0 < n \leq N < M$, $0 < m \leq M$.

10. The method as claimed in claim 9, wherein each gradient in the case of which it is found in step i) that it does not differ from 0 by at least the predetermined threshold value is discarded without being stored.

11. The method as claimed in claim 1, comprising the following steps:
   a) sampling of the signal at times for determining samples
   b) calculating as a first average value a kth average value of a predetermined number N of samples at times which are located in a kth time interval of p time intervals, of which each one has a predetermined duration,
   c) storing the first average value,
   d) calculating a (k+1)th average value of a predetermined number of samples at times which are located in a (k+1)th time interval of the p time intervals,
   e) assessing whether the (k+1)th average value differs from the first average value stored in step c) by at least a predetermined, adjustable threshold value,
   h) determining the gradient between the (k+1)th average value and the first average value,
   i) assessing whether the gradient determined in step h) differs from 0 by at least one predetermined, preferably adjustable threshold value,
   l) if the assessment in step e) and/or in step i) is positive: establishing that the roller bearing is rotating, otherwise
   m) incrementing k by 1 and repeating steps d), e), h), i) and l),
      wherein k, in, n, p, L, M and N are integral numbers and the following applies: $1 \leq k < p$, $0 < n \leq N < M$, $0 < m \leq M$.

12. The method as claimed in claim 11, wherein each (k+1)th average value, in the case of which it is found in step e) that it does not differ from the first average value stored in step c) by at least the predetermined threshold value and each gradient allocated to these average values, in the case of which it is found in step i) that it does not differ from 0 by at least the predetermined threshold value is discarded without being stored.

13. The method as claimed in claim 1, wherein each of the p time intervals extends at the most over an angle of rotation of 90°/z of the roller bearing.

14. The method as claimed in claim 1, wherein the method is continued even when a rotation of the roller hearing has been found.

15. The method as claimed in claim 1, wherein depending on the outcome of the assessment whether the roller bearing is rotating, an output is made on the output device, whether the roller bearing is rotating or not.

16. The method as claimed in claim 1, wherein at least two sensor arrangements are provided at the roller bearing which each deliver a sinusoidal signal dependent on the rotational position of the roller bearing upon rotation of the roller bearing which is sampled, whereupon respective samples are determined and the sensor arrangements are arranged behind one another in the circumferential direction of the roller bearing and have a distance from one another in this circumferential direction which is unequal to an integral multiple of the distance between two adjacent rolling bodies in this circumferential direction, and wherein the signals of all sensor arrangements are evaluated and used for detecting the stationary state.

17. The method as claimed in claim 16, wherein more than z sensor arrangements are provided as a result of which the distance of the sensor arrangements from one another in the circumferential direction of the roller bearing is smaller than the distance of two adjacent rolling bodies from one another in the circumferential direction, and wherein the signals of all sensor arrangements are evaluated in parallel with one another.

18. The method as claimed in claim 16, wherein the signals of all sensor arrangements are additionally used for detecting a possibly occurring to and fro movement of the roller bearing by an angle of rotation within the range of less than 360°/z.

19. A non-transitory computer readable medium containing a computer program stored therein for causing a computer processor to perform and the computer program to detect a stationary state of a roller bearing having z rolling bodies, where z is an integral number and the roller bearing comprises a sensor arrangement which delivers a sinusoidal signal, dependent on a rotational position of the roller bearing upon rotation of the roller bearing, to an evaluating device, wherein the computer program contains means for carrying out the steps according to the method of claim 1 in an evaluating device.

20. A roller bearing comprising z rolling bodies, wherein z is an integral number, and with a device for detecting the stationary state of the roller bearing, comprising at least one sensor arrangement fixed to the roller hearing wherein each sensor arrangement delivers a sinusoidal signal dependent on the rotational position of the roller bearing upon rotation of the roller bearing and at least one evaluating device, each evaluating device being connected to one sensor arrangement, wherein each evaluating device contains an evaluating unit for carrying out the steps according to claim 1.

21. The roller bearing as claimed in claim 20, wherein each sensor arrangement is formed from four strain gauges interconnected to form a Wheatstone bridge, which are arranged behind one another in the circumferential direction of the roller hearing wherein the first strain gauge and the third strain gauge of each sensor arrangement and the second strain gauge and the fourth strain gauge of each sensor arrangement have c-times the distance of two adjacent rolling bodies from one another in the circumferential direction, or two strain gauges interconnected to in each case one Wheatstone half bridge, which arc arranged behind one another in the circumferential direction of the roller bearing, wherein the signal is generated by the rolling bodies rolling over the strain gauges and c is an integral number of greater than or equal to 1.

22. Roller bearing as claimed in claim 21, wherein the strain gauges and the at least one evaluating device are arranged in a circumferential outer groove of the outer ring of the roller bearing.

23. The roller bearing as claimed in claim 20, wherein each evaluating unit is constructed as electrical circuit.

24. The roller bearing as claimed in claim 20, wherein at least two sensor arrangements are provided at the roller bearing which each deliver a sinusoidal signal dependent on the rotational position of the roller bearing upon rotation of the roller bearing, which is sampled in each case, whereupon respective samples are determined, the sensor arrangements are arranged behind one another in the circumferential direction of the roller bearing and have a distance from one another in this circumferential direction which is unequal to an integral multiple of the distance between two adjacent rolling bodies in this circumferential direction, and at least one evaluating device is connected to a number of sensor arrangements as a result of which the signals of the sensor arrangements can be evaluated and used for detecting the stationary state.

25. The roller bearing as claimed in claim 24, wherein more than z sensor arrangements are provided, as a result of which the distance of the sensor arrangements from one another in the circumferential direction of the roller bearing is smaller than the distance of two adjacent rolling bodies from one another in the circumferential direction, and the evaluating device is designed for evaluating the signals of a number sensor arrangements from the respective evaluating units in parallel with one another.

26. The roller bearing as claimed in claim 24, wherein the evaluating device is designed for additionally using the signals of all sensor arrangements for detecting a possibly occurring to and fro movement of the roller bearing by an angle of rotation within the range of less than $360°/z$.

* * * * *